J. B. WIARD.
DYNAMO ELECTRIC MACHINE.
APPLICATION FILED APR. 29, 1907.
925,254.
Patented June 15, 1909.
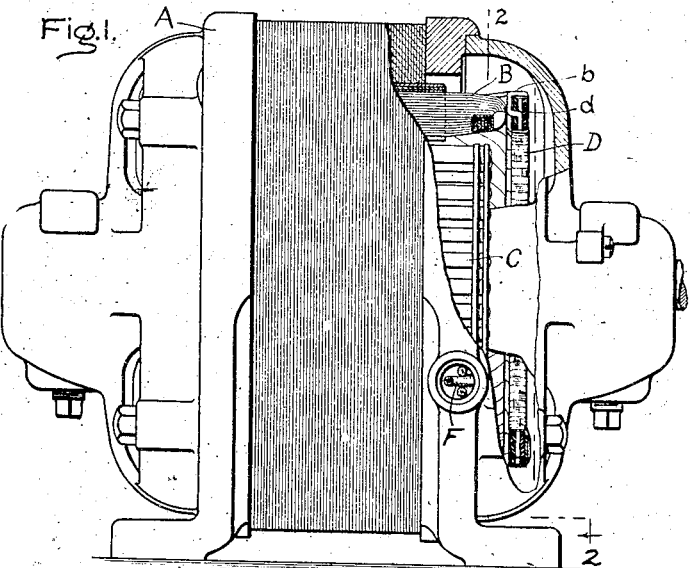
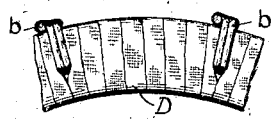
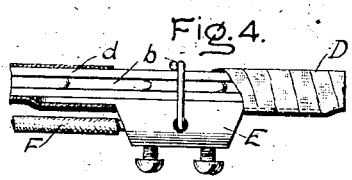
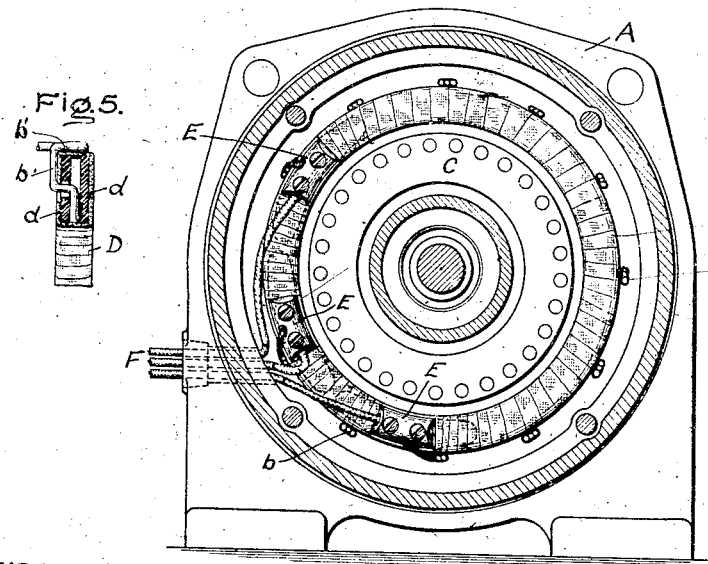
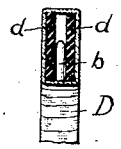
Witnesses:
Irving E. Steers.
J. Ullis Glen.
Inventor,
John B. Wiard,
By Albert… Att'y.

UNITED STATES PATENT OFFICE.

JOHN B. WIARD, OF LYNN, MASSACHUSETTS, ASSIGNOR TO GENERAL ELECTRIC COMPANY, A CORPORATION OF NEW YORK.

DYNAMO-ELECTRIC MACHINE.

No. 925,254.  Specification of Letters Patent.  Patented June 15, 1909.

Application filed April 29, 1907. Serial No. 370,764.

*To all whom it may concern:*

Be it known that I, JOHN B. WIARD, a citizen of the United States, residing at Lynn, county of Essex, State of Massachusetts, have invented certain new and useful Improvements in Dynamo-Electric Machines, of which the following is a specification.

My invention relates to dynamo-electric machines provided with separate connection-rings or cables, as disclosed in my former patent No. 854,784, dated May 28, 1907. As set forth in that patent, it is frequently desirable to arrange a machine, such as an induction motor, for operation on two or more different voltages. This has been accomplished heretofore by making the primary winding of the motor with two or more circuits, which may be connected in series or in parallel. This, in the case of small motors, makes the connections at the ends of the coils bulky. Accordingly, in my former application I described means for forming the connections, which it may be desired to change, by a separate cable connected to the winding and comprising conductors arranged to make the desired connections. By simply removing one cable and substituting another satisfactorily arranged, the motor circuits are changed in the required manner.

My present invention consists in an improved construction of the connection-ring or cable, and to that end comprises certain features which will be definitely pointed out in the appended claims, and which will best be understood by reference to the accompanying drawings, in which—

Figure 1 shows a side elevation, with the casing partly broken away, of an induction motor provided with a connection-ring or cable arranged in accordance with my invention; Fig. 2 shows an end elevation of the same in cross-section on the line 2—2 of Fig. 1; Fig. 3 shows a detail in elevation of the connection-ring; Fig. 4 shows a plan view of the connection-ring with a portion of the covering removed; and Figs. 5 and 6 show cross-sections of the connection-ring at different points in its length.

In the drawings, A represents the motor frame, which includes the usual laminated structure, in which are mounted the coils B of the distributed primary winding.

C represents the rotor, which is shown as a standard squirrel-cage.

D represents the separate connection-ring or cable by means of which the coils for the several poles or phases of the stator are connected together. In this ring are placed two flat, parallel annular strips $d$, which serve to support the conductors $b$, which are clamped between the rings. These strips $d$ may be of insulating material, and are bound together by a suitable wrapping, as shown in the drawings. The ends of the conductors $b$ project from the connection-ring D, and preferably pass through holes in one of the annular strips $d$, as shown in Fig. 5; which construction assists in maintaining the conductors in their proper positions in the ring. The projecting ends of the conductors $b$ are bent over the periphery of the connection-ring D, as is most clearly shown in Figs. 1 and 5, so that when these conductors are attached to the ends of the coils B, they serve to support the ring D in position. The joints between the conductors and the end of the coils, one of which joints is shown at $b^1$ in Fig. 5, may be made in any suitable manner, as by soldering and then taping. The ring D is also provided with terminal blocks E, which may be bound to it by the wrapping, as shown in Fig. 4, and which are adapted to receive the leads F, which connect the primary winding of the machine to the supply circuit.

The construction described facilitates assembling the conductors in the ring, and when completed produces a rigid and compact structure.

What I claim as new, and desire to secure by Letters Patent of the United States, is,—

1. In a dynamo-electric machine, a distributed winding, and a separate connection-ring or cable comprising an annular support and a plurality of electrically-independent circumferentially extending conductors carried thereby independently establishing predetermined connections between the coils of the winding.

2. In a dynamo-electric machine, a distributed winding, and a separate connection-ring or cable comprising an annular support and a plurality of electrically independent circumferentially extending conductors carried by said support with their ends projecting independently establishing predetermined connections between the coils of said winding.

3. In a dynamo-electric machine, a distributed winding, and a separate connection-ring or cable comprising a support in the form of flat parallel annular strips and circumferentially extending conductors bound between said strips with their ends projecting establishing predetermined connections between the coils of said winding.

4. In a dynamo-electric machine, a distributed winding, and a separate connection-ring or cable comprising a support in the form of flat parallel annular strips bound together, and circumferentially extending conductors carried between said strips with their ends projecting through holes in one of said strips establishing predetermined connections between the coils of said winding.

5. In a dynamo-electric machine, a distributed winding, and a separate connection-ring or cable comprising an annular support and a plurality of independent circumferentially extending conductors carried by said support with their ends projecting establishing predetermined connections between the coils of said winding, said projecting ends being bent over the periphery of the ring so that when said ends are secured to the coils they serve to support said ring.

6. In a dynamo-electric machine, a distributed winding, and a separate connection-ring or cable comprising a support in the form of flat parallel annular strips, bound together, and circumferentially extending conductors carried between said strips with their ends projecting through holes in one of said strips establishing predetermined connections between the coils of said winding, said projecting ends being bent over the periphery of the ring so that when said ends are secured to the coils they serve to support said ring.

7. In a dynamo-electric machine, a distributed winding, a separate connection-ring or cable comprising an annular support and a plurality of electrically independent circumferentially extending conductors carried thereby independently establishing predetermined connections between the coils of the winding, and terminal blocks secured to said ring adapted to receive leads from an external circuit.

8. In a dynamo-electric machine, a distributed winding, a separate connection-ring or cable comprising an annular support and a plurality of independent circumferentially extending conductors carried by said support with their ends projecting independently establishing predetermined connections between the coils of said winding, and terminal blocks secured to said ring adapted to receive leads from an external circuit.

9. In a dynamo-electric machine, a distributed winding, a separate connection-ring or cable comprising a support in the form of flat parallel annular strips and circumferentially extending conductors bound between said strips with their ends projecting establishing predetermined connections between the coils of said winding, and terminal blocks secured to said ring adapted to receive leads from an external circuit.

In witness whereof, I have hereunto set my hand this 26th day of April, 1907.

JOHN B. WIARD.

Witnesses:
ALEX. F. MACDONALD,
JOHN A. McMANUS, Jr.